United States Patent
Gao et al.

(10) Patent No.: US 10,700,819 B2
(45) Date of Patent: Jun. 30, 2020

(54) METHOD AND DEVICE FOR PROCESSING HARQ FEEDBACK, METHOD AND DEVICE FOR TRANSMITTING HARQ FEEDBACK

(71) Applicant: ZTE CORPORATION, Guangdong (CN)

(72) Inventors: Minggang Gao, Guangdong (CN); Qingyu Ni, Guangdong (CN); Li Bai, Guangdong (CN); Jiaojiao Xue, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 19 days.

(21) Appl. No.: 16/322,901

(22) PCT Filed: Nov. 10, 2016

(86) PCT No.: PCT/CN2016/105307
§ 371 (c)(1),
(2) Date: Feb. 1, 2019

(87) PCT Pub. No.: WO2018/023893
PCT Pub. Date: Feb. 8, 2018

(65) Prior Publication Data
US 2019/0181988 A1 Jun. 13, 2019

(30) Foreign Application Priority Data
Aug. 2, 2016 (CN) .......................... 2016 1 0624078

(51) Int. Cl.
*H04L 1/00* (2006.01)
*H04L 1/18* (2006.01)
(Continued)

(52) U.S. Cl.
CPC ............. *H04L 1/1812* (2013.01); *H04L 1/08* (2013.01); *H04L 1/16* (2013.01); *H04L 1/1864* (2013.01);
(Continued)

(58) Field of Classification Search
None
See application file for complete search history.

(56) References Cited

U.S. PATENT DOCUMENTS

2011/0243066 A1* 10/2011 Nayeb Nazar .......... H04L 1/007
370/328
2012/0320880 A1* 12/2012 Han .................... H04J 13/0062
370/335
(Continued)

FOREIGN PATENT DOCUMENTS

| CN | 102104469 A | 6/2011 |
|----|-------------|--------|
| CN | 102202326 A | 9/2011 |

(Continued)

OTHER PUBLICATIONS

International Search Report dated Apr. 28, 2017 for International Application No. PCT/CN2016/105307, 5 pages.
(Continued)

*Primary Examiner* — Mujtaba M Chaudry
(74) *Attorney, Agent, or Firm* — Knobbe, Martens, Olson & Bear LLP

(57) ABSTRACT

Disclosed are a method and apparatus for processing a HARQ feedback and a method and apparatus for transmitting a HARQ feedback. The method for processing the HARQ feedback includes: receiving ACK/NACK information transmitted by a terminal simultaneously through a PUSCH and a PUCCH; determining whether a specified record exists in a historical record, the specified record being used for indicating that DCI corresponding to uplink grant information has been transmitted, and the uplink grant information being assigned to the terminal on a PDSCH; and decoding the ACK/NACK information on the PUSCH and/or the PUCCH if the specified record exists. Through the present disclosure, the problem that all data that has been successfully transmitted needs to be retransmitted due to a loss of DCI corresponding to the uplink grant information is solved.

17 Claims, 8 Drawing Sheets

(51) Int. Cl.
*H04L 5/00* (2006.01)
*H04L 1/16* (2006.01)
*H04L 1/08* (2006.01)
*H04W 72/04* (2009.01)
*H04W 48/12* (2009.01)
*H04W 24/02* (2009.01)

(52) U.S. Cl.
CPC ......... *H04L 5/0055* (2013.01); *H04W 72/042* (2013.01); *H04W 72/0413* (2013.01); *H04W 24/02* (2013.01); *H04W 48/12* (2013.01)

(56) References Cited

U.S. PATENT DOCUMENTS

| | | | |
|---|---|---|---|
| 2015/0029971 A1* | 1/2015 | Nishio | H04L 5/0055 370/329 |
| 2015/0208366 A1* | 7/2015 | Papasakellariou | H04W 52/34 370/311 |
| 2015/0230223 A1 | 8/2015 | Bautista | |
| 2016/0337108 A1* | 11/2016 | Choi | H04W 72/0446 |
| 2017/0208619 A1* | 7/2017 | Yang | H04W 72/1284 |

FOREIGN PATENT DOCUMENTS

| | | |
|---|---|---|
| CN | 104105213 A | 10/2014 |
| WO | 2015119751 A1 | 8/2015 |

OTHER PUBLICATIONS

Written Opinion of the International Searching Authority dated Apr. 28, 2017 for International Application No. PCT/CN2016/105307, 3 pages.

* cited by examiner

METHOD AND DEVICE FOR PROCESSING HARQ FEEDBACK, METHOD AND DEVICE FOR TRANSMITTING HARQ FEEDBACK

CROSS REFERENCE TO RELATED APPLICATIONS

This is a U.S. National Stage Application, filed under 35 U.S.C. 371, of International Patent Application No. PCT/CN2016/105307, filed on Nov. 10, 2016, which claims priority to Chinese patent application No. 201610624078.X filed on Aug. 2, 2016, contents of both of which are incorporated herein by reference in their entireties.

TECHNICAL FIELD

The present disclosure relates to the field of communications and, in particular, relates to a method and device for processing a hybrid automatic repeat request (HARQ) feedback and a method and device for transmitting a HARQ feedback.

BACKGROUND

In the long term evolution (LTE) system, reliability and performance of the transmission are greatly increased by using the hybrid automatic repeat request (HARQ) transmission technology. For frequency division duplex (FDD), the uplink subframe and downlink subframe are symmetrical, so it is quite simple to perform the HARQ process, and the timing correspondences are also quite consistent. For time division duplex (TDD), the number of uplink subframes and the number of downlink subframes vary greatly in different configurations due to the difference in the resource assignment ratio of the uplink subframe and downlink subframe. Therefore, the HARQ feedback in TDD is more complicated, and the HARQ feedback has two processing methods: HARQ bundling and HARQ multiplexing. These two methods compensate each other's defects and may be configured through the network side.

In the case of better channel conditions, the HARQ bundling method may greatly reduce the number of bits used in feedback, but also has a drawback. When a packet is wrong, multiple packets associated with the packet need to be retransmitted, and in the case of poor channel quality, the overhead for retransmission is relatively high. How to feed back a HARQ when the detection of the downlink is missed is a significant consideration in the third generation partnership project (3GPP) protocol, while no regulations are given for a specific case in which the detection of the uplink grant is missed.

If the uplink grant of DCI0 is received on the n-km subframe, the terminal needs to feed back a HARQ acknowledgement (ACK)/negative-acknowledgement (NACK) using a physical uplink shared channel (PUSCH) on the uplink subframe n.

If the uplink grant of DCI0 is not received on the n-km subframe, the terminal needs to feed back the HARQ ACK/NACK using a physical uplink control channel (PUCCH) on the uplink subframe n. If the uplink grant of DCI0 is transmitted by the network side on the n-km subframe and the terminal misses the detection of the uplink grant of DCI0 for some reason (missing detection may be caused by many reasons, some of which are unavoidable, such as a sharp deterioration of the channel condition), the terminal mistakenly considers that the uplink grant of DCI0 is not transmitted by the network side, while the network side considers that it has transmitted the uplink grant of DCI0. Then the network side expects to receive the HARQ ACK/NACK on the PUSCH. However, the terminal transmits the HARQ ACK/NACK on the PUCCH, causing that the network side misses the uplink HARQ ACK/NACK, and leading to following consequences.

(1) If a UE intends to feed back the HARQ ACK and the network does not receive the feedback, the network will consider that the UE did not receive any data, then all data packets are retransmitted, resulting in a retransmission in vain and reducing performance.

(2) If the UE intends to feed back the HARQ NACK and the network does not receive the feedback, the network will consider that the UE did not receive any data, then all the data packets are retransmitted using a NDI flipping method. When the UE receives the NDI flipping, the UE empties the HARQ buffer and deleting the received data in the HARQ buffer, so the transmission needs to be repeated from the beginning, losing an advantage of the HARQ in incremental redundancy decoding.

If a DCI format 0/4 is lost, the UE does not know whether the eNodeB has transmitted the DCI format 0/4 since the UE does not receive the DCI format 0/4 at all. The UE feeds back the ACK/NACK according to currently received information, and the UE feeds back the ACK/NACK on the PUCCH. In addition, the eNodeB does not receive the ACK/NACK on the expected PUSCH. This is because the UE does not receive the DCI format 0/4 and the resource for the ACK/NACK feedback is changed (changed from the PUSCH to the PUCCH), instead of because the downlink transmission is not successful. Since the protocol does not specify this special case, the eNodeB detects no uplink information on the PUSCH and considers that the mobile phone did not receive the downlink data, so the eNodeB retransmits all the data that has been successfully transmitted, resulting in poor efficiency.

SUMMARY

Embodiments of the present disclosure provide a method and device for processing a HARQ feedback and a method and device for transmitting the HARQ feedback, to solve at least the problem, in the related art, that all data that has been successfully transmitted is retransmitted due to a missing of DCI corresponding to the uplink grant information.

An embodiment of the present disclosure provides a method for processing the HARQ feedback. The method for processing the HARQ feedback includes: receiving acknowledgment (ACK)/negative-acknowledgment (NACK) feedback information transmitted by a terminal simultaneously through a physical uplink shared channel (PUSCH) and a physical uplink control channel (PUCCH); determining whether a specified record exists in a historical record, where the specified record is used for indicating that downlink control information (DCI) corresponding to uplink grant information has been transmitted, and the uplink grant information is assigned to the terminal on a physical downlink control channel (PDCCH); and decoding the ACK/NACK information on the PUSCH and/or the PUCCH in response to determining that the specified record exists in the historical record.

In an exemplary embodiment, the historical record further includes DCI corresponding to downlink resource assignment information, and the downlink resource assignment information is assigned to the terminal on the PDCCH.

In an exemplary embodiment, the historical record further includes DCI corresponding to downlink resource assignment information, and the downlink resource assignment information is assigned to the terminal on the PDSCH.

In an exemplary embodiment, a format of the DCI corresponding to the downlink resource assignment information includes at least: DCI 1, DCI 1A or DCI 2A; and a format of the DCI corresponding to the uplink grant information includes at least: DCI 0 or DCI 4.

In an exemplary embodiment, when an uplink resource needs to be transmitted within a current transmission time interval (TTI), the DCI corresponding to the uplink grant information is assigned to the terminal.

In an exemplary embodiment, the step of decoding the ACK/NACK information on the PUSCH and/or the PUCCH includes: determining whether the ACK/NACK information on the PUSCH is successfully decoded, and decoding the ACK/NACK information on the PUSCH in response to determining that the ACK/NACK information on the PUSCH is not decoded successfully.

In an exemplary embodiment, the ACK is configured to instruct a network side device to transmit new downlink data to the terminal, and the NACK is configured to instruct the network side device to retransmit delivered downlink data to the terminal.

In an exemplary embodiment, the step of decoding the ACK/NACK information on the PUSCH and/or the PUCCH further includes: determining a result of decoding the ACK/NACK information is NACK if the decoding of ACK/NACK information fails.

Another embodiment of the present disclosure provides a method for processing the HARQ feedback transmission. The method includes: receiving first downlink control information (DCI) corresponding to downlink resource assignment information and second DCI corresponding to uplink grant information and performing decoding, where the first DCI and the second DCI are assigned to a terminal on a physical downlink control channel (PDCCH) by a network side device; decoding data transmitted on the PDSCH to obtain decoded data; generating acknowledgement (ACK)/negative-acknowledgment (NACK) information according to the first DCI, the second DCI, and the decoded data; encoding the ACK/NACK information, and modulating and assigning the encoded ACK/NACK information onto a physical uplink shared channel (PUSCH) and a physical uplink control channel (PUCCH); and transmitting the encoded ACK/NACK information to the network side device simultaneously through the PUSCH and the PUCCH.

In an exemplary embodiment, a format of the first DCI includes at least: DCI 1, DCI 1A or DCI 2A; and a format of the second DCI includes at least: DCI 0 or DCI 4.

In an exemplary embodiment, when the second DCI corresponding to the uplink grant information assigned by the network side device on the PDSCH is not received, the method further includes: transmitting the encoded ACK/NACK information to the network side device through the PUSCH.

In an exemplary embodiment, when only one of the PUSCH and the PUCCH is allowed to transmit the ACK/NACK information to the network side device, the method further includes: transmitting the encoded ACK/NACK information to the network side device through the PUSCH.

In an exemplary embodiment, the step of loading the ACK/NACK information on the PUCCH and encoding the ACK/NACK information includes: encoding the ACK/NACK information according to the lowest control channel element (CCE) index corresponding to the last received DCI.

Another embodiment of the present disclosure provides a device for processing the HARQ feedback. The device includes: a receiving module, which is configured to receive acknowledgment (ACK)/negative-acknowledgment (NACK) feedback information transmitted by a terminal simultaneously through a PUSCH and a PUCCH; a query module, which is configured to determine whether a specified record exists in a historical record, where the specified record is used for indicating that DCI corresponding to uplink grant information has been transmitted, and the uplink grant information is uplink grant information assigned to the terminal on a PDCCH; and a decoding module, which is configured to decode the ACK/NACK information on the PUSCH and/or the PUCCH in response to determining that the specified record exists in the historical record.

In an exemplary embodiment, the historical record further includes DCI corresponding to downlink resource assignment information which is assigned to the terminal on the PDCCH.

In an exemplary embodiment, the decoding module includes: a determining unit, which is configured to determine whether the ACK/NACK information on the PUSCH is decoded successfully; and a decoding unit, which is configured to decode the ACK/NACK information on the PUCCH in response to determining that the ACK/NACK information on the PUSCH is not decoded successfully.

In an exemplary embodiment, the decoding module includes: a determination unit, which is configured to determine that a result of decoding the ACK/NACK information is NACK if the decoding of ACK/NACK information fails.

Another embodiment of the present disclosure provides a device for processing the HARQ feedback transmission. The device includes: a first decoding module, which is configured to receive first downlink control information (DCI) corresponding to downlink resource assignment information and second DCI corresponding to uplink grant information, where the first DCI and the second DCI are assigned to the terminal on a PDCCH by a network side device, and perform decoding; a second decoding module, which is configured to decode data transmitted on the PDSCH to obtain decoded data; a generation module, which is configured to generate the ACK/NACK information according to the first DCI, the second DCI, and the decoded data; an encoding module, which is configured to encode the ACK/NACK information, and modulate and assign the encoded ACK/NACK feedback onto the PUSCH and the PUCCH; and a transmitting module, which is configured to transmit the encoded ACK/NACK information to the network side device simultaneously through the PUSCH and the PUCCH.

In an exemplary embodiment, when the second DCI corresponding to the uplink grant information assigned by the network side device on the PDCCH is not received, the transmitting module is further configured to transmit the encoded ACK/NACK information to the network side device through the PUCCH.

In an exemplary embodiment, when only one of the PUSCH and the PUCCH is allowed to transmit the ACK/NACK information to the network side device, the transmitting module is further configured to transmit the encoded ACK/NACK information to the network side device through the PUSCH.

In an exemplary embodiment, the decoding module is further configured to encode the ACK/NACK information according to the lowest CCE index corresponding to the last received DCI.

Another embodiment of the present disclosure provides a time division duplex (TDD) network system. The system includes: a network side device and a terminal. The network side device is configured to transmit to the terminal first downlink control information (DCI) corresponding to downlink resource assignment information assigned to the terminal and second DCI corresponding to uplink grant information assigned to the terminal; receive acknowledgment (ACK)/negative-acknowledgment (NACK) feedback information transmitted by the terminal simultaneously through a PUSCH and a PUCCH; and determine whether a specified record exists in a historical record, where the specified record is used for indicating that the second DCI has been transmitted and the uplink grant information is uplink grant information assigned to the terminal on a PDCCH; and decode the ACK/NACK information on the PUSCH and/or the PUCCH if the specified record exists in the historical record. The terminal is configured to receive the first DCI and the second DCI, and perform decoding; decode data transmitted on the PDSCH to obtain decoded data; generate the ACK/NACK information according to the first DCI, the second DCI, and the decoded data; encode the ACK/NACK information, and modulate and assign the encoded ACK/NACK information onto the PUSCH and the PUCCH; and transmit the encoded ACK/NACK information to the network side device simultaneously through the PUSCH and the PUCCH.

Another embodiment of the present disclosure further provides a storage medium. The storage medium is configured to store program codes for executing the steps described below.

In a step S11, receiving acknowledgment (ACK)/negative-acknowledgment (NACK) feedback information transmitted by a terminal simultaneously through a PUSCH and a PUCCH.

In a step S12, determining whether a specified record exists in a historical record, where the specified record is used for indicating that DCI corresponding to uplink grant information has been transmitted, and the uplink grant information is uplink grant information assigned to the terminal on a PDCCH.

In a step S13, in response to determining that the specified record exists in the historical record, decoding the ACK/NACK information on the PUSCH and/or the PUCCH.

In an exemplary embodiment, the storage medium is further configured to store program codes for executing the steps described below.

In a step S21, determining whether the ACK/NACK information on the PUSCH is decoded successfully.

In a step S22, in response to determining that the ACK/NACK information on the PUSCH is not decoded successfully, decoding the ACK/NACK information on the PUCCH.

Another embodiment of the present disclosure further provides another storage medium. The storage medium is configured to store program codes for executing the steps described below.

In a step S11, receiving first downlink control information (DCI) corresponding to downlink resource assignment information and second DCI corresponding to uplink grant information, where the first DCI and the second DCI are assigned to a terminal on a physical downlink control channel (PDCCH) by a network side device, and performing decoding.

In a step S12, decoding data transmitted on the PDSCH to obtain decoded data.

In a step S13, generating ACK/NACK feedback information according to the first DCI, the second DCI, and the decoded data.

In a step S14, encoding the ACK/NACK information, and modulating and assigning the encoded ACK/NACK information onto the PUSCH and the PUCCH.

In a step S15, transmitting the encoded ACK/NACK information to the network side device simultaneously through the PUSCH and the PUCCH.

According to the present disclosure, the network side device determines whether the DCI corresponding to the uplink grant information has been transmitted to the terminal after receiving the ACK/NACK feedback information transmitted by the terminal simultaneously through the PUSCH and the PUCCH. Therefore, the problem, in the related art, that all data that has been successfully transmitted is retransmitted due to missing DCI corresponding to the uplink grant information is solved, and thereby the data transmission efficiency in the TDD system is improved.

BRIEF DESCRIPTION OF DRAWINGS

The drawings described herein are used to provide a further understanding of the present disclosure and form a part of the present application. The exemplary embodiments in the present disclosure and descriptions thereof are used to explain the present disclosure and not to limit the present disclosure in any improper way. In the drawings.

DETAILED DESCRIPTION

Hereinafter the present disclosure will be described in detail with reference to the drawings in conjunction with the embodiments. It is to be noted that if not in collision, the embodiments and features therein in the present application may be combined with each other.

It is to be noted that the terms "first", "second" and the like in the specification, claims and drawings of the present disclosure are used to distinguish between similar objects and are not necessarily used to describe a particular order or sequence.

Embodiment 1

Figure 1:
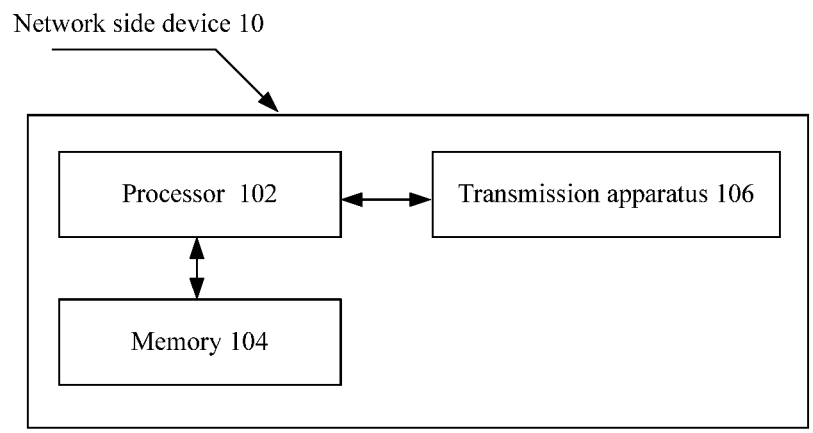
FIG. 1 is a block diagram illustrating a hardware structure of a network side device of a method for processing a HARQ feedback according to an embodiment of the present disclosure.

A method embodiment provided by the embodiment 1 of the present application may be executed in a mobile terminal, a computer terminal or other similar computing apparatuses. An example in which the method is executed on the network side device is described below. FIG. 1 is a block diagram illustrating a hardware structure of a network side device of a method for processing a HARQ feedback according to an embodiment of the present disclosure. As shown in FIG. 1, a network side device 10 may include one or more (only one is shown in FIG. 1) processors 102 (the processor 102 may include, but is not limited to, a microprocessor such as a microcontroller unit (MCU), a programmable logic device such as a field programmable gate array (FPGA) or other processing apparatuses), a memory 104 used for storing data, and a transmission apparatus 106 used for implementing a communication function. It should be understood by those of ordinary skill in the art that the structure shown in FIG. 1 is merely illustrative and not intended to limit the structure of the electronic apparatus described above. For example, the network side device 10 may further include more or less components than the components shown in FIG. 1, or has a configuration different from the configuration shown in FIG. 1.

The memory 104 may be used for storing software programs and modules of application software, such as program instructions/modules corresponding to method for processing the HARQ feedback in the embodiments of the present disclosure. The one or more processors 102 execute the software programs and modules stored in the memory 104 so as to perform various function applications and data processing, that is, to implement the method described above. The memory 104 may include a high-speed random access memory, and may further include a nonvolatile memory, such as one or more magnetic storage apparatuses, flash memories or other nonvolatile solid-state memories. In some examples, the memory 104 may further include memories that are remotely disposed with respect to the one or more processors 102. These remote memories may be connected to the network side device 10 via a network. Examples of the network described above include, but are not limited to, the Internet, an intranet, a local area network, a mobile communication network and a combination thereof.

The transmission apparatus 106 is used for receiving or transmitting data via a network. Specific examples of such a network may include a wireless network provided by a communication provider of the network side device 10. In one example, the transmission apparatus 106 includes a network interface controller (NIC), which may be connected to other network devices via a base station and thus be capable of communicating with the Internet. In one example, the transmission apparatus 106 may be a radio frequency (RF) module, which is used for communicating with the Internet in a wireless way.

It should be noted that the hardware structure described above is also applicable to the method for processing the HARQ feedback transmission in the following embodiments, and details are not described below again.

Figure 2:
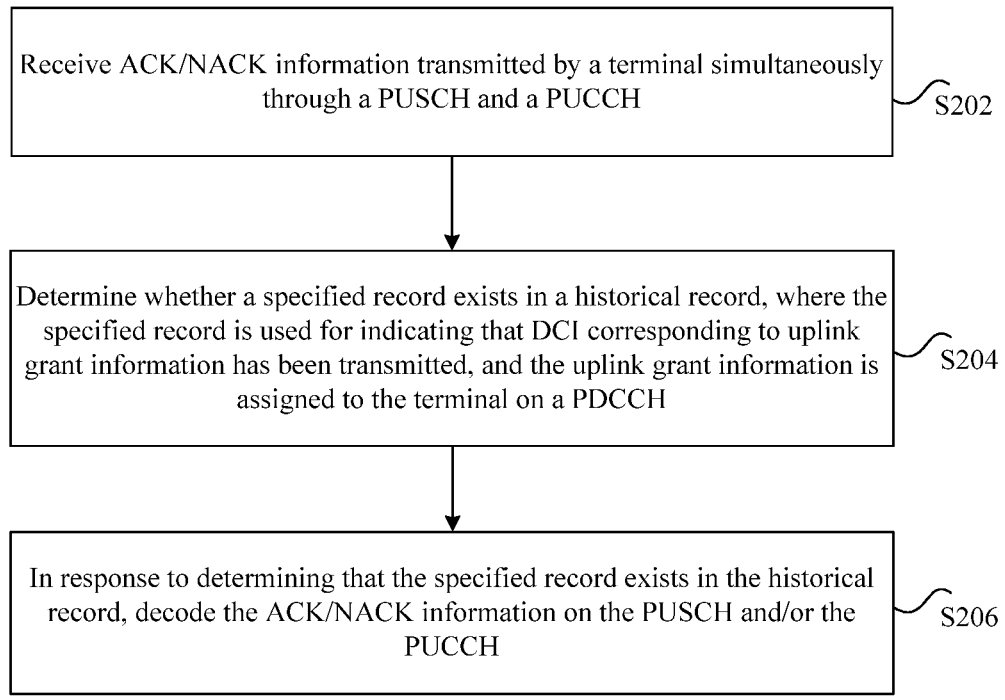
FIG. 2 is a flowchart of the method for processing the HARQ feedback according to the embodiment of the present disclosure.

An embodiment provides a method for processing a HARQ feedback executed by a network side device. FIG. 2 is a flowchart of a method for processing a HARQ feedback according to an embodiment of the present disclosure. As shown in FIG. 2, the method includes steps described below.

In S202, an acknowledgment (ACK)/negative-acknowledgment (NACK) feedback is received, where the ACK/NACK feedback is transmitted by a terminal simultaneously through a PUSCH and a PUCCH.

In S204, it is determined whether a specified record exists in a historical record. The specified record is used for indicating that DCI corresponding to uplink grant information has been transmitted. The uplink grant information is assigned to the terminal on a PDCCH.

In an exemplary embodiment, the historical record further stores DCI corresponding to downlink resource assignment information. The downlink resource assignment information is downlink resource assignment information assigned to the terminal on the PDCCH.

Specifically, a format of the DCI corresponding to the uplink grant information includes: DCI 0 or DCI 4, and a format of the DCI corresponding to the downlink resource assignment information includes at least: DCI 1, DCI 1A or DCI 2A.

It should be noted that when the network side device assigns the DCI to the terminal, the network side device first assigns the DCI corresponding to the downlink resource assignment information, so that the terminal decodes data on the PDSCH according to the DCI corresponding to the downlink resource assignment information, and feeds back the ACK/NACK. Then, the network side device assigns the DCI corresponding to the uplink grant information to the terminal.

Specifically, in the transmission time interval (TTI), the network side device assigns the DCI corresponding to the uplink grant information to the terminal. Outside the TTI, the network side device rejects to assign the DCI corresponding to the uplink grant information to the terminal.

In S206, in response to determining that the specified record exists in the historical record, the ACK/NACK is decoded on the PUSCH and/or the PUCCH.

Specifically, the network side receives the ACK/NACK transmitted by the terminal through both of the PUSCH and the PUCCH, so if the network side enables the characteristic that the PUCCH and the PUSCH are transmitted simultaneously and delivers the DCI0/4 in a transmission window, when decoding the ACK/NACK, the network side device first uses the PUSCH for decoding. If the decoding is unsuccessful, the network side device uses the PUCCH for decoding. If the characteristic that the PUCCH and the PUSCH are transmitted simultaneously is disabled, and if DCI0/4 is delivered in the transmission window, the network side device tries to perform decoding on the PUSCH. If the decoding fails, the network side device considers the feedback is NACK. If DCI0/4 is not delivered in the transmission window, the network side device directly uses the PUCCH for decoding. If the decoding on the PUCCH fails, the network side device considers that the feedback is NACK. Through the method described above, the success probability of decoding the ACK/NACK by the network side device can be improved, and directly clearing data that has been transmitted successfully when the DCI corresponding to the uplink grant information is missed can be avoided.

In addition, the scenarios below are also provided in the embodiment to facilitate understanding of the technical solution described in the embodiment.

Scenario 1

Table 1 shows the detection steps of the network side device when the terminal successfully receives the DCI corresponding to the uplink grant information, and the PUCCH and the PUSCH are allowed to transmit the ACK/NACK at the same time.

TABLE 1

| Detection step | 1 | 2 |
|---|---|---|
| Channel | PUSCH | PUCCH |
| Whether to be detected by the network side | Yes | Depend on the detection result of step 1. |
| Operation | If the detection is successful, end. If the detection fails, go to step 2. | If the detection is successful, the feedback is ACK/NACK. If the detection fails, the feedback is considered to be NACK. |

Scenario 2

Table 2 shows the detection step of the network side device when the terminal successfully receives the DCI corresponding to the uplink grant information, and the PUCCH and the PUSCH are not allowed to transmit the ACK/NACK at the same time.

TABLE 2

| Detection step | 1 |
|---|---|
| Channel | PUCCH |
| Whether to be detected by the network side | Yes |
| Operation | If the detection is successful, the feedback is ACK/NACK. If the detection fails, the feedback is considered to be NACK. |

Scenario 3

Table 3 is the detection steps when the terminal missed the DCI corresponding to the uplink grant information.

TABLE 3

| Detection step | 1 | 2 |
|---|---|---|
| Channel | PUSCH | PUCCH |
| Whether to be detected by the network side | Yes | Depend on the detection result of step 1. |
| Operation | If the detection is successful, end. If the detection fails, go to step 2. | If the detection is successful, the feedback is ACK/NACK. If the detection fails, the feedback is considered to be NACK. |

From the description of the above embodiment, it will be apparent to those skilled in the art that the method in the above embodiments may be implemented by software plus a necessary general-purpose hardware platform, or may of course be implemented by hardware. However, in many cases, the former is a preferred implementation mode. Based on this understanding, the solutions provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device, or the like) to execute the method according to each embodiment of the present disclosure.

Embodiment 2

Figure 3:
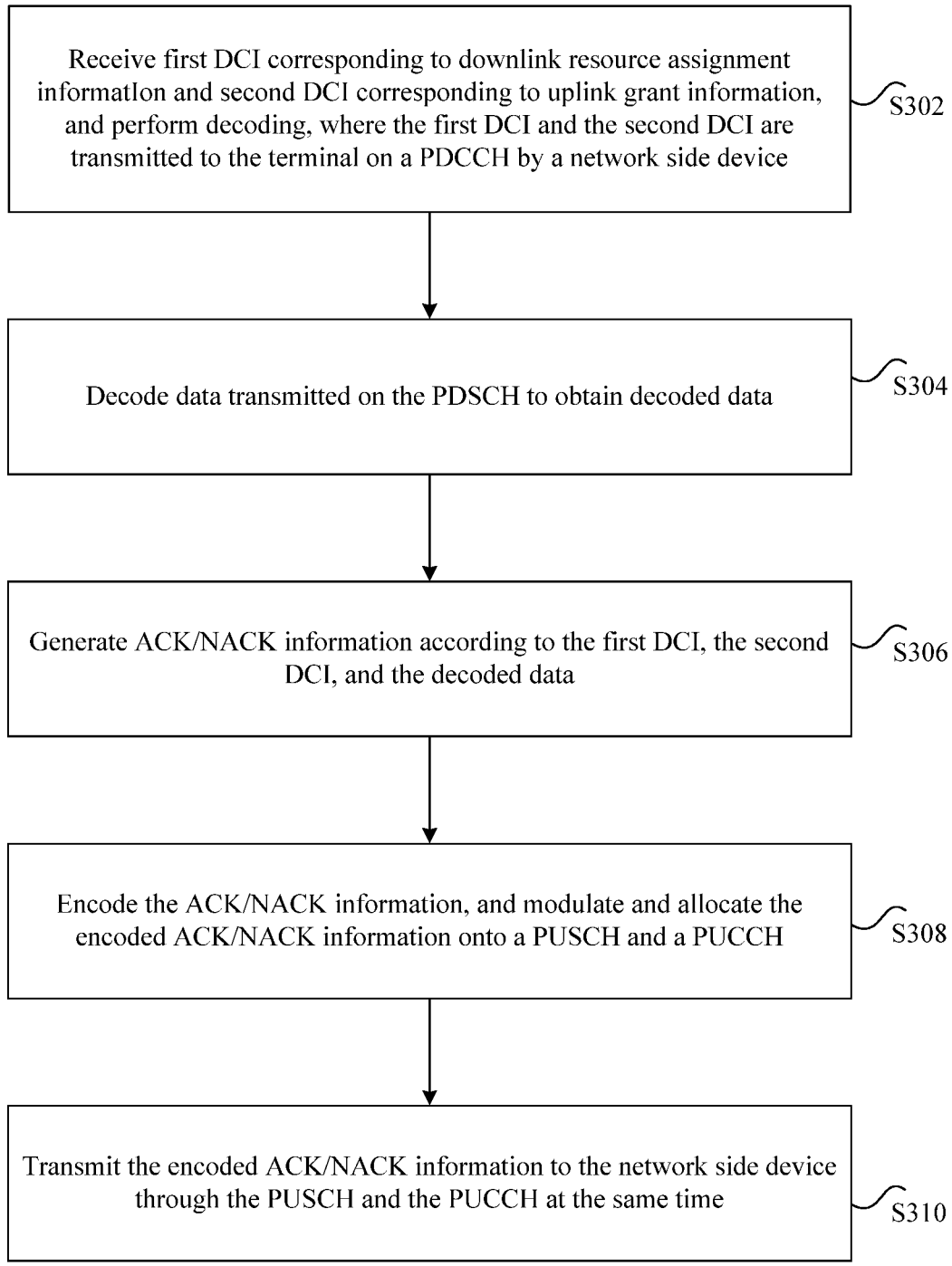
FIG. 3 is a flowchart of a method for transmitting a HARQ feedback according to an embodiment of the present disclosure.

An embodiment provides a method for processing a HARQ feedback transmission executed on a terminal. FIG. 3 is a flowchart of the method for processing a HARQ feedback transmission according to the embodiment of the present disclosure. As shown in FIG. 3, the method includes steps described below.

In step S302, first downlink control information (DCI) corresponding to downlink resource assignment information and second DCI corresponding to uplink grant information are received, where the first DCI and the second DCI are assigned to the terminal on a PDCCH by a network side device, and decoding is performed.

Specifically, the terminal further needs to determine whether the second DCI is received. If the second DCI is received by the terminal, the terminal performs the steps described below and shown in FIG. 3. If the second DCI is received by the terminal, the terminal transmits the encoded ACK/NACK to the network side device through the PUCCH.

It should be noted that, a format of the first DCI includes at least: DCI 1, DCI 1A or DCI 2A; and a format of the second DCI includes at least: DCI 0 or DCI 4.

In step S304, data transmitted on the PDSCH is decoded to obtain decoded data.

In step S306, an ACK/NACK feedback is generated according to the first DCI, the second DCI, and the decoded data.

Specifically, according to information used for decoding, such as resource assignment, modulation and coding scheme (MCS), and redundancy version (RV), in the first DCI and the second DCI, the terminal attempts to perform decoding on a resource block specified by the resource assignment. After the decoding, the terminal performs a cyclic redundancy check (CRC) check on the decoded information. In response to determining that the check is successful, ACK is fed back, and in response to determining that the check fails, NACK is fed back.

It should be noted that the terminal performs decoding on the PDSCH only according to the information used for decoding in the first DCI. The ACK/NACK is fed back according to the decoding result, and the function of the second DCI information is to indicate on which PUSCH resource the ACK/NACK is transmitted, and what encoding information is used by the terminal to encode the ACK/NACK. Therefore, the first DCI is used for downlink decoding and the second DCI is used for encoding uplink ACK/NACK feedback.

In step S308, the ACK/NACK is encoded, and the encoded ACK/NACK is modulated and assigned onto a PUSCH and a PUCCH.

In step S310, the encoded ACK/NACK is transmitted to the network side device simultaneously through the PUSCH and the PUCCH.

In an exemplary embodiment, when the PUSCH and the PUCCH are unable to transmit the encoded ACK/NACK at the same time, the encoded ACK/NACK is transmitted to the network side device through the PUSCH.

Specifically, by determining the version supported by the current terminal (for example, whether the terminal is a terminal before the Rel 10 protocol or a terminal after the Rel 10 protocol) and the functions of the network side device (for example, whether the current network side device has or enables the function of simultaneous PUCCH-PUSCH), it is determined whether the encoded ACK/NACK can be transmitted to the network side device through the PUSCH and the PUCCH at the same time. In an exemplary embodiment, the process of encoding the ACK/NACK on the PUCCH includes: encoding the ACK/NACK according to the lowest CCE index corresponding to the last received DCI.

Specifically, when the terminal uploads resources, a mapping relationship between the ACK/NACK and the PDCCH needs to be established, and therefore, the ACK is associated with the sequence number of the lowest CCE of the PDCCH. For example, if the PDCCH received by the terminal is CCH14, the CCH14 is composed of CCH0-CCH3, and CCH0 corresponds to CCE0, a mapping relationship between the ACK/NACK used by the terminal and the CCE0 is established. Therefore, when the terminal feeds back the ACK/NACK, the terminal can upload the ACK/NACK using the PDCCH that is in a mapping correspondence with the ACK/NACK.

It should be noted that, the present embodiment further provides a schematic diagram of a terminal for each scenario in the embodiment 1.

Figure 4:
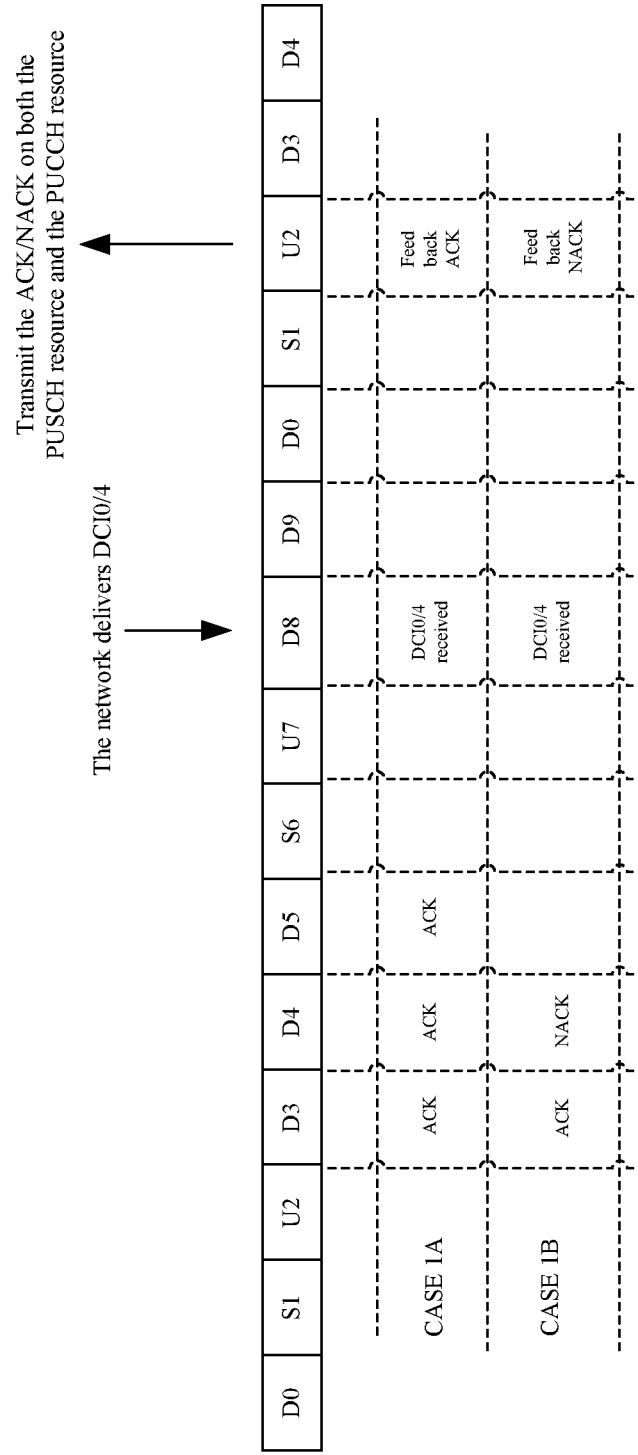
FIG. 4 is a schematic diagram of a terminal corresponding to a scenario 1 according to the embodiment of the present disclosure.

FIG. 4 is a schematic diagram of a terminal corresponding to the scenario 1 according to the embodiment of the present disclosure, that is FIG. 4 shows the corresponding operations of the terminal when the terminal successfully receives the DCI corresponding to the uplink grant information and the PUCCH and the PUSCH are allowed to simultaneously transmit the ACK/NACK.

Figure 5:
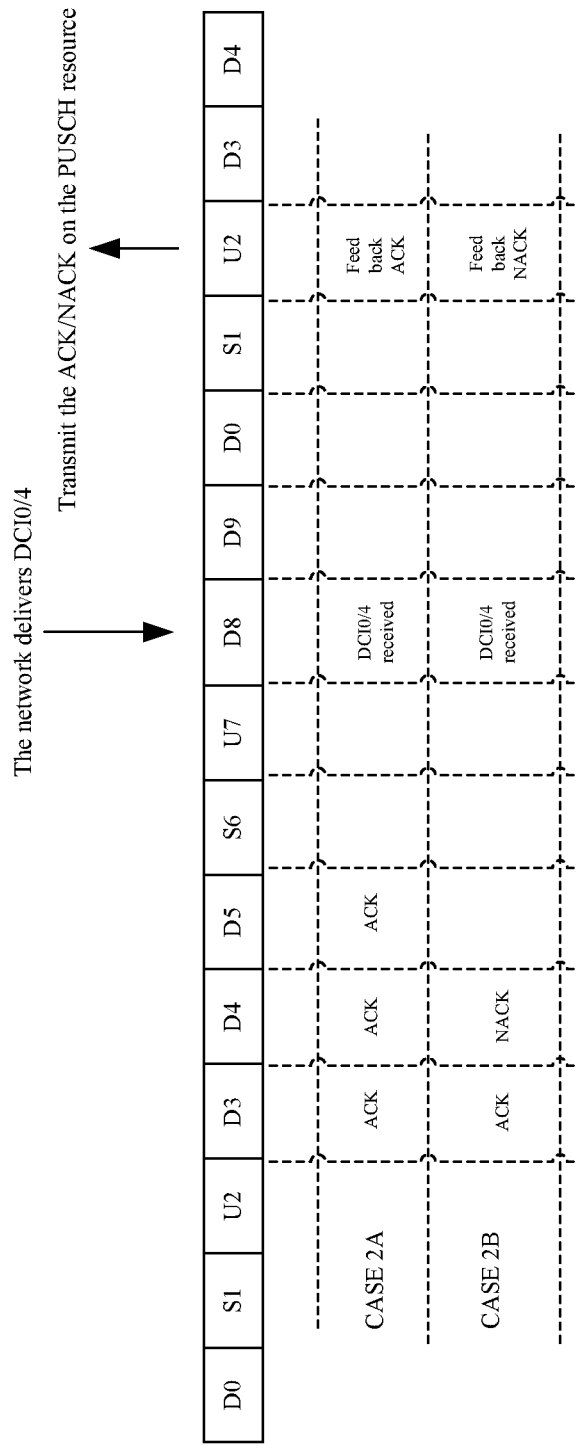
FIG. 5 is a schematic diagram of a terminal corresponding to a scenario 2 according to the embodiment of the present disclosure.

FIG. 5 is a schematic diagram of a terminal corresponding to the scenario 2 according to the embodiment of the present disclosure, that is, FIG. 5 shows the corresponding operations of the terminal when the terminal successfully receives the DCI corresponding to the uplink grant information and the PUCCH and the PUSCH are not allowed to simultaneously transmit the ACK/NACK.

Figure 6:
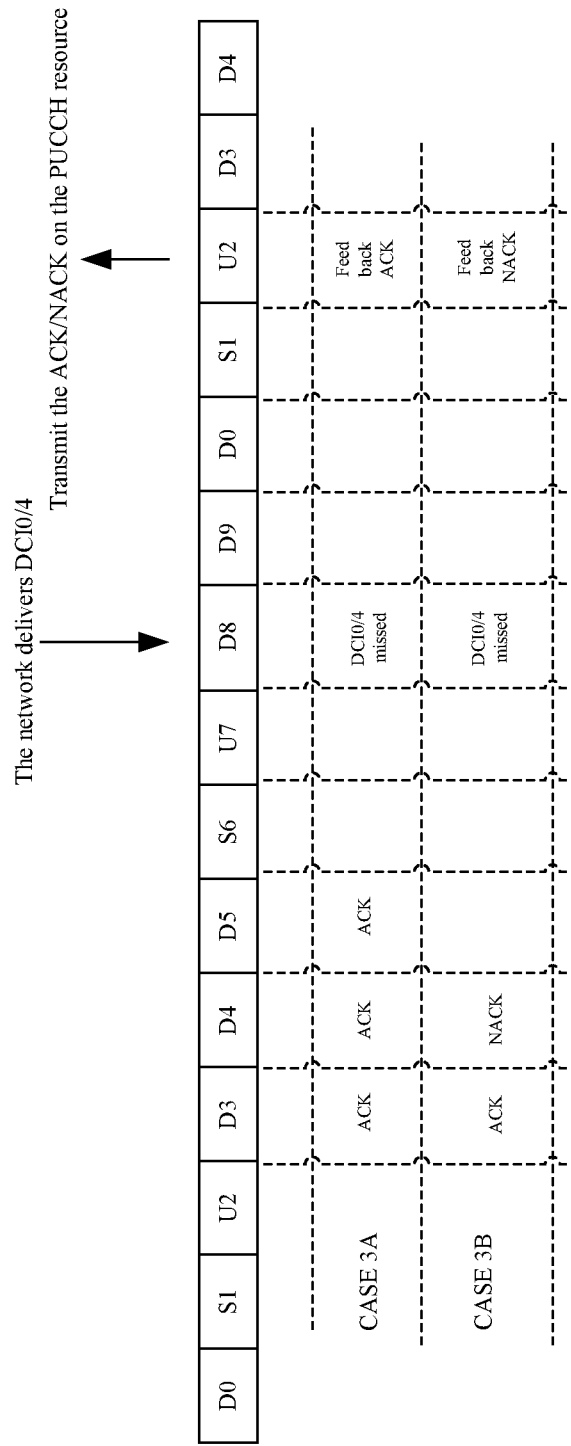
FIG. 6 is a schematic diagram of a terminal corresponding to a scenario 3 according to the embodiment of the present disclosure.

FIG. 6 is a schematic diagram of a terminal corresponding to the scenario 3 according to the embodiment of the present disclosure, that is, FIG. 6 shows the corresponding operations of the terminal when the terminal misses the DCI corresponding to the uplink grant information.

Embodiment 3

An embodiment of the present disclosure further provides a device for processing a HARQ feedback. The device is configured to implement the above-mentioned embodiments and preferred embodiments. What has been described will not be repeated. As used below, a term "module" may be software or hardware capable of implementing predetermined functions, or a combination thereof. The device in the embodiments described below is preferably implemented by software, but implementation by hardware or by a combination of software and hardware is also possible and conceived.

Figure 7:
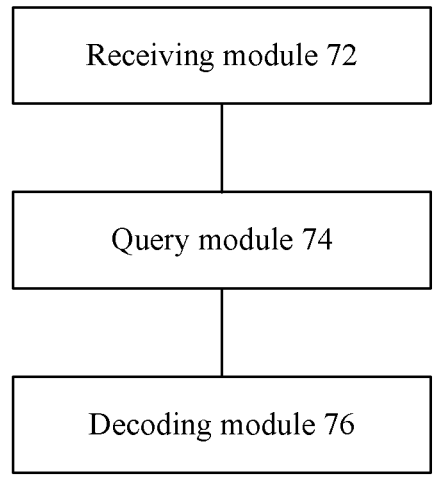
FIG. 7 is a structural diagram of a device for processing a HARQ feedback according to an embodiment of the present disclosure.

FIG. 7 is a structural diagram of a device for processing a HARQ feedback according to the embodiment of the present disclosure. As shown in FIG. 7, the device includes a receiving module 72, a query module 74 and a decoding module 76.

The receiving module 72 is configured to receive an acknowledgment (ACK)/negative-acknowledgment (NACK) transmitted by a terminal through a PUSCH and a PUCCH at the same time.

The query module 74 is configured to determine whether a specified record exists in a historical record. The specified record is used for indicating that DCI corresponding to uplink grant information has been transmitted, and the uplink grant information is uplink grant information assigned to the terminal on a PDCCH.

In an exemplary embodiment, the historical record further stores DCI corresponding to downlink resource assignment information. The downlink resource assignment information is downlink resource assignment information assigned to the terminal on the PDCCH.

Specifically, a format of the DCI corresponding to the uplink grant information includes: DCI 0 or DCI 4, and a format of the DCI corresponding to the downlink resource assignment information includes at least: DCI 1, DCI 1A or DCI 2A.

It should be noted that when the network side device assigns the DCI to the terminal, the network side device first assigns the DCI corresponding to the downlink resource assignment information, and accordingly, the terminal feeds back the ACK/NACK, and then, the network side device assigns the DCI corresponding to the uplink grant information to the terminal.

Specifically, in the transmission time interval (TTI), the network side device assigns the DCI corresponding to the uplink grant information to the terminal. Outside the TTI, the network side device rejects to assign the DCI corresponding to the uplink grant information to the terminal.

The decoding module 76 is configured to decode the ACK/NACK on the PUSCH and/or the PUCCH in response to determining that the specified record exists in the historical record.

Figure 8:
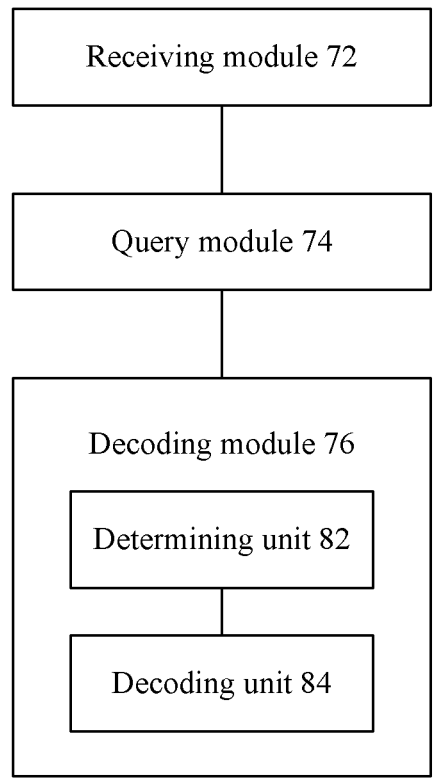
FIG. 8 is a structural diagram of another device for processing a HARQ feedback according to the embodiment of the present disclosure.

FIG. 8 is a structural diagram of another device for processing a HARQ feedback according to the embodiment of the present disclosure. As shown in FIG. 8, the device includes all the modules shown in FIG. 7. In addition, the decoding module further includes: a determining unit 82 and a decoding unit 84.

The determining unit 82 is configured to determine whether the ACK/NACK on the PUSCH is decoded successfully.

The decoding unit 84 is configured to decode the ACK/NACK on the PUCCH in response to determining that the ACK/NACK on the PUSCH is not decoded successfully.

Figure 9:
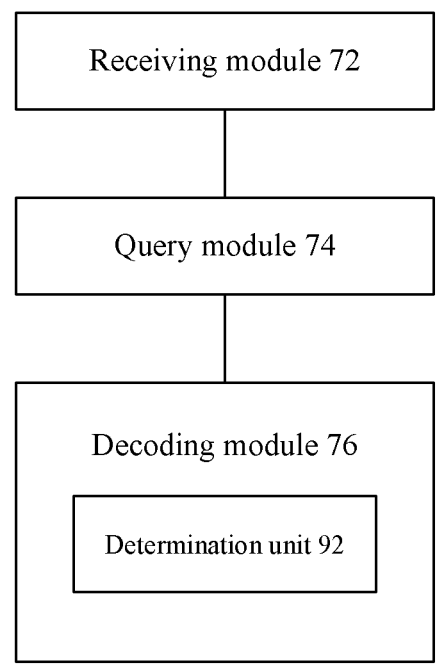
FIG. 9 is a structural diagram of another device for processing a HARQ feedback according to the embodiment of the present disclosure.

FIG. 9 is a structural diagram of another device for processing a HARQ feedback according to the embodiment of the present disclosure. As shown in FIG. 9, the device includes all the modules shown in FIG. 8. In addition, the decoding module further includes: a determination unit 92.

The determination unit 92 is configured to determine that a result of decoding the ACK/NACK is NACK in response to determining that the ACK/NACK feedback is failed to be decoded.

It should be noted that the various modules described above may be implemented by software or hardware. Implementation by hardware may, but may not necessarily, be realized in the following manners: the various modules described above are located in a same processor, or the various modules described above are located in different processors in any combination form.

Embodiment 4

An embodiment of the present disclosure further provides a device for processing a terminal device. The device is configured to implement the above-mentioned embodiments and preferred embodiments. What has been described will not be repeated. As used below, a term "module" may be software, hardware or a combination thereof capable of implementing predetermined functions. The device in the embodiments described below is preferably implemented by software, but implementation by hardware or by a combination of software and hardware is also possible and conceived.

Figure 10:
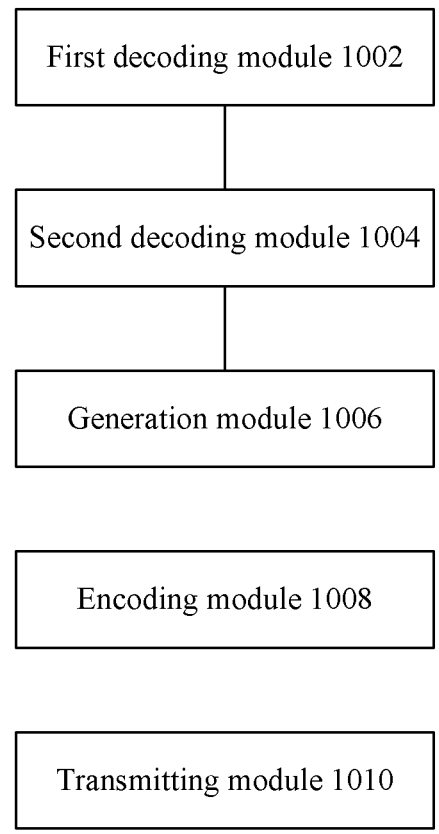
FIG. 10 is a structural diagram of a device for transmitting a HARQ feedback according to an embodiment of the present disclosure.

FIG. 10 is a structural diagram of a device for processing a HARQ feedback transmission according to the embodiment of the present disclosure. As shown in FIG. 10, the device includes a first decoding module 1002, a second decoding module 1004, a generation module 1006, an encoding module 1008 and a transmitting module 1010.

The first decoding module 1002 is configured to receive first downlink control information (DCI) corresponding to downlink resource assignment information and second DCI corresponding to uplink grant information, where the first DCI and the second DCI are assigned to the terminal on a PDCCH by a network side device, and perform decoding.

Specifically, the first decoding module 1002 further needs to determine whether the second DCI is received. If the second DCI is received, the operations of the second decoding module 1004 and subsequent modules are performed. If the second DCI is not received, the terminal transmits the encoded ACK/NACK to the network side device through the PUCCH.

The second decoding module 1004 is configured to decode data transmitted on the PDSCH to obtain decoded data.

The generation module 1006 is configured to generate an ACK/NACK according to the first DCI, the second DCI, and the decoded data.

The encoding module 1008 is configured to encode the ACK/NACK, and modulate and assign the encoded ACK/NACK onto a PUSCH and a PUCCH.

In an exemplary embodiment, the encoding module 1008 is further configured to encode the ACK/NACK on the PUCCH according to the lowest CCE index corresponding to the last received DCI.

The transmitting module 1010 is configured to transmit the encoded ACK/NACK to the network side device simultaneously through the PUSCH and the PUCCH.

Embodiment 5

Figure 11:
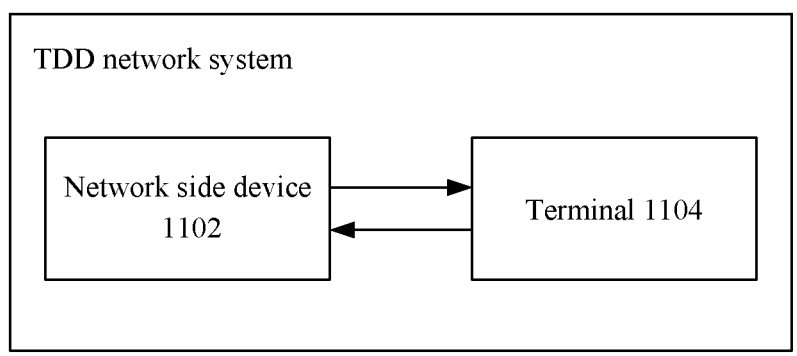
FIG. 11 is a schematic diagram of a TDD network system according to an embodiment of the present disclosure.

An embodiment provides a TDD network system. FIG. 11 is a schematic diagram of the TDD network system according to the embodiment of the present disclosure. As shown in FIG. 11, the TDD network system includes: a network side device 1102 and a terminal 1104.

The network side device 1102 is configured to transmit to the terminal 1104 first DCI corresponding to downlink resource assignment information assigned to the terminal 1104 and second DCI corresponding to uplink grant information assigned to the terminal 1104; receive an ACK/NACK transmitted by the terminal 1104 simultaneously through a PUSCH and a PUCCH; determine whether a specified record exists in a historical record, where the specified record is used for indicating that the second DCI has been transmitted and the uplink grant information is uplink grant information assigned to the terminal 1104 on a PDCCH, and decode the ACK/NACK on the PUSCH and/or the PUCCH in response to determining that the specified record exists in the historical record.

The terminal 1104 is configured to receive the first DCI and the second DCI, and perform decoding; decode data transmitted on the PDSCH to obtain decoded data; generate the ACK/NACK according to the first DCI, the second DCI, and the decoded data; encode the ACK/NACK, and modulate and assign the encoded ACK/NACK onto the PUSCH and the PUCCH; and transmit the encoded ACK/NACK to the network side device simultaneously through the PUSCH and the PUCCH.

It should be noted that, a format of the first DCI includes at least: DCI 1, DCI 1A or DCI 2A; and a format of the second DCI includes at least: DCI 0 or DCI 4.

In an exemplary embodiment, when the PUSCH and the PUCCH are unable to transmit the encoded ACK/NACK at the same time, the encoded ACK/NACK is transmitted to the network side device through the PUSCH.

Embodiment 6

An embodiment of the present disclosure further provides a storage medium. Optionally, in the embodiment, the storage medium may be configured to store program codes for executing the steps described below.

In a step S11, an ACK/NACK transmitted by a terminal simultaneously through a PUSCH and a PUCCH is received.

In a step S12, it is determined whether a specified record exists in a historical record. The specified record is used for indicating that DCI corresponding to uplink grant information has been transmitted, and the uplink grant information is uplink grant information assigned to the terminal on a PDCCH.

In a step S13, in response to determining that the specified record exists in the historical record, the ACK/NACK is decoded on the PUSCH and/or the PUCCH.

In an exemplary embodiment, the storage medium is further configured to store program codes for executing the step described below.

In a step S21, it is determined whether the ACK/NACK on the PUSCH is decoded successfully.

In a step S22, in response to determining that the ACK/NACK on the PUSCH is not decoded successfully, the ACK/NACK on the PUCCH is decoded.

Optionally, in the embodiment, the storage medium may include, but is not limited to, a USB flash drive, a read-only memory (ROM), a random access memory (RAM), a mobile hard disk, a magnetic disk, an optical disk or another medium capable of storing the program codes.

Optionally, for specific examples in the embodiment, reference may be made to the examples described in the above embodiments and exemplary embodiments, and repetition will not be made in the embodiment.

Embodiment 7

Another embodiment of the present disclosure further provides another storage medium. The storage medium is configured to store program codes for executing the steps described below.

In a step S11, first DCI corresponding to downlink resource assignment information and second DCI corresponding to uplink grant information are received, where the first DCI and the second DCI are assigned to the terminal on a PDCCH by a network side device, and decoding is performed.

In a step S12, data transmitted on the PDSCH is decoded to obtain decoded data.

In a step S13, an ACK/NACK is generated according to the first DCI, the second DCI, and the decoded data.

In a step S14, the ACK/NACK is encoded, and the encoded ACK/NACK is modulated and assigned onto a PUSCH and a PUCCH.

In a step S15, the encoded ACK/NACK is transmitted to the network side device simultaneously through the PUSCH and the PUCCH.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

INDUSTRIAL APPLICABILITY

The present disclosure relates to the field of communications and provides a method and device for processing a HARQ feedback and a method and device for transmitting the HARQ feedback. After receiving the ACK/NACK transmitted by the terminal on the PUSCH and the PUCCH at the same time, the network side device determines whether the DCI corresponding to the uplink grant information has been transmitted to the terminal. Therefore, the problem, in the related art, that all data that has been successfully transmitted is retransmitted due to missing the DCI corresponding to the uplink grant information is solved, and thereby the data transmission efficiency in the TDD system is improved.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the scope of the present disclosure.

What is claimed is:

1. A method for processing a hybrid automatic repeat request (HARQ) feedback, comprising:
   receiving, by a network side device, acknowledgment (ACK)/negative-acknowledgment (NACK) information transmitted simultaneously by a terminal through a physical uplink shared channel (PUSCH) and a physical uplink control channel (PUCCH);
   determining, by the network side device, whether a specified record exists in a historical record, wherein the specified record is used for indicating that downlink control information (DCI) corresponding to uplink grant information has been transmitted, and wherein the uplink grant information is assigned to the terminal on a physical downlink control channel (PDCCH); and
   decoding, by the network side device, the ACK/NACK information on the PUSCH and/or the PUCCH in response to determining that the specified record exists in the historical record.

2. The method of claim 1, wherein the historical record further comprises DCI corresponding to downlink resource assignment information, and the downlink resource assignment information is assigned to the terminal on the PDCCH.

3. The method of claim 1, wherein a format of the DCI corresponding to the downlink resource assignment information comprises at least one of: DCI 1, DCI 1A and DCI 2A; and wherein a format of the DCI corresponding to the uplink grant information comprises at least one of: DCI 0 and DCI 4.

4. The method of claim 1, further comprising:
   transmitting the DCI corresponding to the uplink grant information to the terminal in a current transmission time interval (TTI).

5. The method of claim 1, wherein the decoding the ACK/NACK information on the PUSCH and/or the PUCCH comprises:
   determining whether the ACK/NACK information on the PUSCH is decoded successfully; and
   decoding the ACK/NACK information on the PUCCH in response to determining that the ACK/NACK information on the PUSCH is not decoded successfully.

6. The method of claim 1, wherein the ACK is configured to instruct a network side device to transmit new downlink data to the terminal, and the NACK is configured to instruct the network side device to retransmit delivered downlink data to the terminal.

7. The method of claim 1, wherein decoding the ACK/NACK feedback on the PUSCH and/or the PUCCH further comprises:
   determining that the ACK/NACK information is NACK in response to determining that the decoding of the ACK/NACK information fails.

8. A method for transmitting a hybrid automatic repeat request (HARQ) feedback, comprising:
   receiving, by a terminal, first downlink control information (DCI) corresponding to downlink resource assignment information and second DCI corresponding to uplink grant information, wherein the first DCI and the second DCI are assigned to the terminal through a physical downlink control channel (PDCCH) by a network side device, and performing decoding;
   receiving, by the terminal, data on a physical downlink shared channel (PDSCH) according to the first DCI;
   determining, by the terminal, acknowledgement (ACK)/negative-acknowledgment (NACK) information according to whether data received the PDSCH is successfully decoded;
   encoding, by the terminal, the ACK/NACK information; and
   transmitting, by the terminal, the encoded ACK/NACK information to the network side device simultaneously through a physical uplink shared channel (PUSCH) and a physical uplink control channel (PUCCH), wherein the encoded ACK/NACK information is transmitted through the PUSCH according to the second DCI.

9. The method of claim 8, wherein a format of the first DCI comprises at least one of: DCI 1, DCI 1A and DCI 2A; and wherein a format of the second DCI comprises at least one of: DCI 0 and DCI 4.

10. The method of claim 8, wherein in a case where the second DCI corresponding to the uplink grant information assigned by the network side device on the PDCCH is not received, the method further comprises: transmitting the encoded ACK/NACK information to the network side device through the PUCCH.

11. The method of claim 8, wherein in a case where only one of the PUSCH and the PUCCH is allowed to transmit the ACK/NACK information to the network side device, the method further comprises: transmitting the encoded ACK/NACK information to the network side device through the PUSCH.

12. The method of claim 8, wherein the ACK/NACK information is encoded according to a lowest control channel element (CCE) index corresponding to a last received DCI.

13. A terminal, comprising:
a processor; and
a memory communicably connected with the processor and for storing instructions executable by the processor,
wherein execution of the instructions by the processor causes the processor to:
receive first downlink control information (DCI) indicating downlink resource assignment information and second DCI indicating uplink grant information, wherein the first DCI and the second DCI are transmitted by a network side device through a physical downlink control channel (PDCCH);
receive data on a physical downlink shared channel (PDSCH) according to the first DCI;
determine acknowledgement (ACK)/negative-acknowledgment (NACK) information according to whether the data received the PDSCH is successfully decoded;
encode the ACK/NACK information; and
transmit the encoded ACK/NACK information to the network side device simultaneously through a physical uplink shared channel (PUSCH) and a physical uplink control channel (PUCCH), wherein the encoded ACK/NACK information is transmitted through the PUSCH according to the second DCI.

14. The terminal of claim 13, wherein a format of the first DCI comprises at least one of: DCI 1, DCI 1A and DCI 2A; and wherein a format of the second DCI comprises at least one of: DCI 0 and DCI 4.

15. The terminal of claim 13, wherein in a case where the second DCI is not received, the terminal transmits the encoded ACK/NACK information to the network side device through the PUCCH.

16. The terminal of claim 13, wherein in a case where only one of the PUSCH and the PUCCH is allowed to transmit the encoded ACK/NACK information to the network side device, the terminal transmits the encoded ACK/NACK information to the network side device through the PUSCH.

17. The terminal of claim 13, wherein the ACK/NACK information is encoded according to a lowest control channel element (CCE) index corresponding to a last received DCI.

* * * * *

UNITED STATES PATENT AND TRADEMARK OFFICE
CERTIFICATE OF CORRECTION

PATENT NO. : 10,700,819 B2  
APPLICATION NO. : 16/322901  
DATED : June 30, 2020  
INVENTOR(S) : Minggang Gao Page 1 of 1

It is certified that error appears in the above-identified patent and that said Letters Patent is hereby corrected as shown below:

In the Specification

In Columns 2-3, Lines 66-67 and 1-2, below "PDCCH." delete "In an exemplary embodiment, the historical record further includes DCI corresponding to downlink resource assignment information, and the downlink resource assignment information is assigned to the terminal on the PDSCH.".

In the Claims

In Column 16, Line 1, Claim 3, delete "claim 1," and insert --claim 2,--.

Signed and Sealed this  
First Day of December, 2020

Andrei Iancu  
*Director of the United States Patent and Trademark Office*